(12) United States Patent
Gray et al.

(10) Patent No.: US 11,957,941 B1
(45) Date of Patent: Apr. 16, 2024

(54) FIRE SUPPRESSING INSULATION

(71) Applicant: UIPCO, LLC, San Antonio, TX (US)

(72) Inventors: Emily Margaret Gray, San Antonio, TX (US); Brian Francisco Shipley, Plano, TX (US); Justin Dax Haslam, San Antonio, TX (US); Robert Wiseman Simpson, Fair Oaks Ranch, TX (US); Donnette Moncrief Brown, San Antonio, TX (US); Eric David Schroeder, San Antonio, TX (US); Michael J. Maciolek, Boerne, TX (US); Bobby Lawrence Mohs, San Antonio, TX (US); Manfred Amann, San Antonio, TX (US); Rochelle Ann Tijerina, San Antonio, TX (US); Meredith Beveridge, Golden, CO (US)

(73) Assignee: United Services Automobile Association (USAA), San Antonio, TX (US)

( * ) Notice: Subject to any disclaimer, the term of this patent is extended or adjusted under 35 U.S.C. 154(b) by 579 days.

(21) Appl. No.: 16/940,765

(22) Filed: Jul. 28, 2020

Related U.S. Application Data

(60) Provisional application No. 62/879,813, filed on Jul. 29, 2019.

(51) Int. Cl.
*A62C 2/06* (2006.01)
*F16L 59/02* (2006.01)

(52) U.S. Cl.
CPC ............ *A62C 2/065* (2013.01); *F16L 59/026* (2013.01)

(58) Field of Classification Search
CPC .. A62C 2/06; A62C 2/065; A62C 2/10; A62C 8/06; A62C 3/16; A62C 3/002; A62C 3/0214; F16L 59/026; B32B 2307/3065; B32B 17/069; B32B 17/10311; B32B 2307/308
USPC .......................................................... 169/48
See application file for complete search history.

(56) References Cited

U.S. PATENT DOCUMENTS

| | | | |
|---|---|---|---|
| 4,991,657 A | 2/1991 | LeLande, Jr. | |
| 5,623,995 A | 4/1997 | Smagac | |
| 5,645,926 A * | 7/1997 | Horrocks ............ | D06M 15/233 428/920 |
| 6,523,616 B1 | 2/2003 | Wallace | |
| 7,886,837 B1 | 2/2011 | Helfgott | |
| 9,619,996 B1 | 4/2017 | Smith | |

(Continued)

OTHER PUBLICATIONS

Non-Final Office Action mailed Aug. 2, 2022 for U.S. Appl. No. 16/887,690.

(Continued)

*Primary Examiner* — Qingzhang Zhou
*Assistant Examiner* — Juan C Barrera
(74) *Attorney, Agent, or Firm* — Plumsea Law Group, LLC

(57) ABSTRACT

A fire suppressing insulation. This insulation will create a barrier that blocks a fire to protect a structure from damage and will assist in suppressing the fire. Also, a fire suppression system including two walls, such as an interior wall and an exterior wall or two interior walls. The walls are spaced apart from each other by a divider to define an interior volume. At least a portion of the interior volume includes fire suppressing insulation that will form a fire suppressing intumescent barrier between the walls when exposed to the heat of a fire.

20 Claims, 7 Drawing Sheets

(56) References Cited

U.S. PATENT DOCUMENTS

| | | | |
|---|---|---|---|
| 11,311,758 B2* | 4/2022 | Vandemark | A62C 99/0045 |
| 2008/0045110 A1* | 2/2008 | Small, Jr. | B32B 5/26 |
| | | | 156/278 |
| 2010/0000743 A1 | 1/2010 | Cohen | |
| 2013/0280535 A1* | 10/2013 | Maas | B32B 27/365 |
| | | | 264/234 |
| 2015/0238789 A1 | 8/2015 | Johnson | |
| 2019/0299037 A1* | 10/2019 | Foerg | B32B 5/02 |
| 2019/0374799 A1* | 12/2019 | Münzenberger | A62C 2/065 |

OTHER PUBLICATIONS

Final Office Action mailed Oct. 24, 2023 for U.S. Appl. No. 18/158,877.

Notice of Allowance mailed Nov. 14, 2022 for U.S. Appl. No. 16/887,690.

Non-Final Office Action mailed Jul. 14, 2023 for U.S. Appl. No. 18/158,877.

* cited by examiner

FIRE SUPPRESSING INSULATION

CROSS-REFERENCE TO RELATED APPLICATIONS

This application claims the benefit of Provisional Patent Application No. 62/879,813, filed Jul. 29, 2019, and titled "Fire Suppressing Insulation," which is incorporated by reference herein in its entirety.

BACKGROUND OF THE DISCLOSURE

1. Field of the Invention

The present disclosure relates to fire-suppressing insulation. In particular, the invention relates to insulation that uses intumescence to suppress fire and mitigate damage to a structure. The disclosure also relates to a system for fire suppression.

2. Description of Related Art

Insulation, particularly insulation against hot and cold exterior temperatures, often is placed in exterior walls of structures. Such insulation may take many forms, such as batts of fiber, blown-in fiber, and solid slabs. Fibers typically include fiber glass, rock wool, paper, and particulates, such as vermiculite. Slabs may include foamed thermoplastic or thermoset plastics.

Such thermal insulation typically is not a fire-suppressant. Whereas the insulation may not itself be flammable, it typically does not serve as a fire block and does little to no fire suppression. Indeed, some types, such as foamed polystyrene, are flammable and may require fireproofing for use in an occupied building.

There is a need in the art for a system and method that addresses the shortcomings of the prior art discussed above.

SUMMARY OF THE DISCLOSURE

The disclosure is directed to a fire suppressing insulation. This insulation will create a barrier that blocks a fire to protect a structure from damage and will assist in suppressing the fire.

In one aspect, the disclosure provides fire suppressing insulation, the insulation comprising fiber treated with an intumescent material in quantity sufficient to form a fire suppressing intumescent barrier when exposed to the heat of a fire.

In another aspect, the disclosure provides a fire suppressing system. The system comprises a wall having an interior wall and an exterior wall. The interior wall is spaced apart from the exterior wall by a divider disposed between the interior wall and the exterior wall. The interior wall and the exterior wall define an interior volume. A portion of the interior volume includes fire suppressing insulation, the fire suppressing insulation comprising fiber treated with an intumescent material in quantity sufficient to form a fire suppressing intumescent barrier between the interior wall and the exterior wall when exposed to the heat of a fire.

In still another aspect, the disclosure provides a fire suppressing system. The system comprises a wall having a first interior wall and a second interior wall. The first interior wall is spaced apart from the second interior wall by a divider disposed between the first interior wall and the second interior wall. The first interior wall and the second interior wall define an interior volume. A portion of the interior volume includes fire suppressing insulation, the fire suppressing insulation comprising fiber treated with an intumescent material in quantity sufficient to form a fire suppressing intumescent barrier between the first interior wall and the second interior wall when exposed to the heat of a fire.

In all aspects, the intumescent material expands in the heat of a fire and forms an essentially continuous fire suppressing layer during a fire. The fire suppressing layer protects flammable material on the side opposite the flame from burning.

Other systems, methods, features, and advantages of the disclosure will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION OF THE DISCLOSURE

The disclosure is directed to a fire suppressing insulation. This insulation will create a barrier that blocks a fire to protect a structure from damage and will assist in suppressing the fire. Fire is a significant danger to people and to structures. Therefore, control and suppression of a fire in or on a structure is a worthwhile effort to save people and property from injury and damage. If one can extinguish a fire quickly, damage will be minimized. However, many fires occur when a structure is not occupied or in a structure having an automatic alarm system. Such a system typically requires that the temperature exceed a set point for operation of an automatic fire suppression water sprinkler or for notification of first responder fire extinguishing services. Thus, there exists a need for a passive fire suppressing system that can be effective in a shorter period.

The disclosure provides embodiments of such a passive fire suppressing system. In one aspect, the disclosure provides fire suppressing insulation. Typically, the insulation comprises fiber treated with an intumescent material in quantity sufficient to form a fire suppressing intumescent barrier when exposed to the heat of a fire. Throughout the specification and claims, the phrase "heat of a fire" means a heat sufficient to initiate the char-forming reaction. A large fire, such as a forest fire, may initiate the char-forming reaction at a distance further from the intumescent material than would a smaller fire in a pan on a range, for example. Various forms of insulation may be used. Typically, in embodiments of the disclosure, fiber is used to form the insulation.

In one aspect, the disclosure provides fire suppressing insulation, the insulation comprising fiber treated with an intumescent material in quantity sufficient to form a fire suppressing intumescent barrier when exposed to the heat of a fire. The fire-suppressing insulation may be any thermal insulation comprising individual fibers. For example, fiberglass insulation in the form of batts is suitably used for preparing fire-suppressing insulation. Also, loose fibers, such as rock wool, various forms of cellulose, and similar fiber and particulate insulation commonly known as blown-in insulation, also may be suitable.

Figure 1:
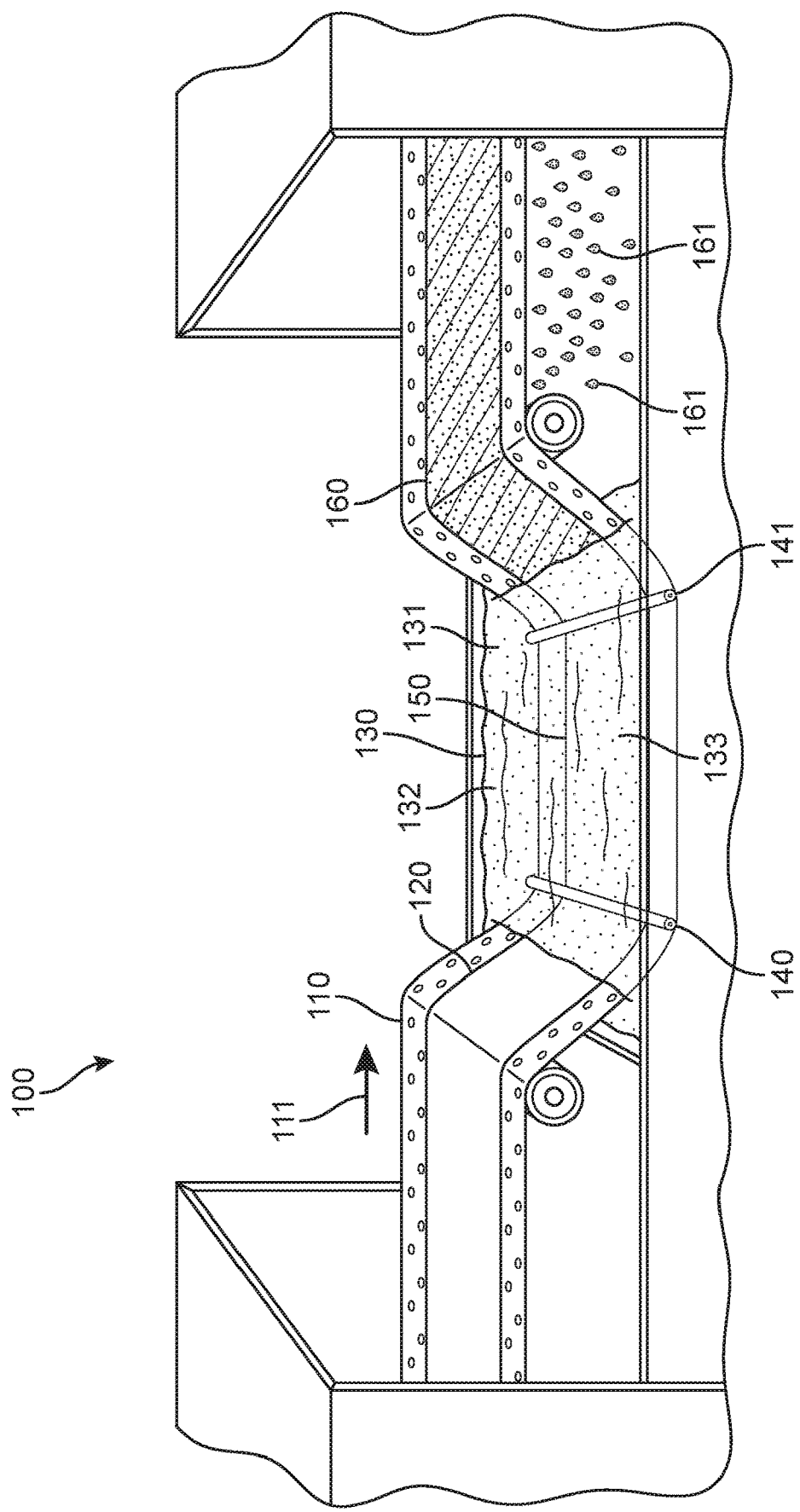
FIG. 1 is a schematic illustration of insulation preparation.

FIG. 1 illustrates an embodiment of a system 100 for preparing fire-suppressing insulation. In the system, continuous belt 110 moves in the direction of movement arrow 111. Thermal insulation 120 is carried by continuous belt 110 into bath 130. Bath 130 is a fluid bath that may serve many purposes. For example, in some embodiments, if thermal insulation 120 is in the form of a batt, fluid 131 may be a carrier for particulate intumescent material 132. In some embodiments in which the thermal insulation 120 is in the form of a batt that has not been compressed and glued, fluid 133 may be adhesive. The adhesive may be fluid intumescent material. An intumescent material may serve to both glue the batt and adhere particulate intumescent material 132, if present, to the fibers of the batt.

Thermal insulation 120 is introduced to bath 130 on continuous belt 110 and is submerged under first submersion roller 140. Second submersion roller 141 ensures that the batt 120 remains submerged in bath 130. Second submersion roller 141 also may serve to compress now-saturated thermal insulation 150 to a pre-selected thickness. Continuous belt 110 lifts fire-suppressing insulation 160 out of bath 130. Excess fluid and loose particulate 161 is allowed to drip from fire-suppressing insulation 160 and may be recovered for re-use.

Figure 2:
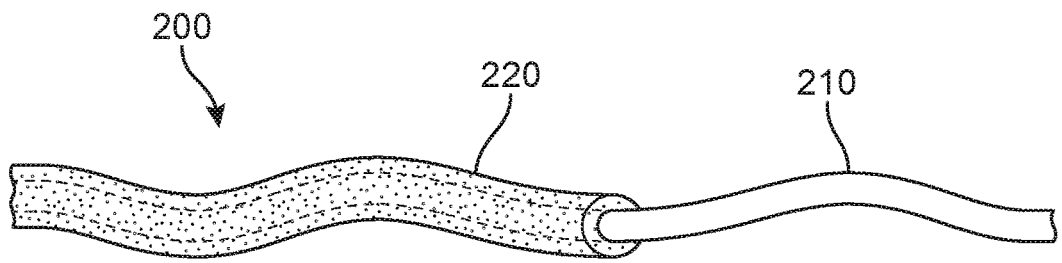
FIG. 2 is an illustration of an embodiment of intumescent coating.
Figure 3:
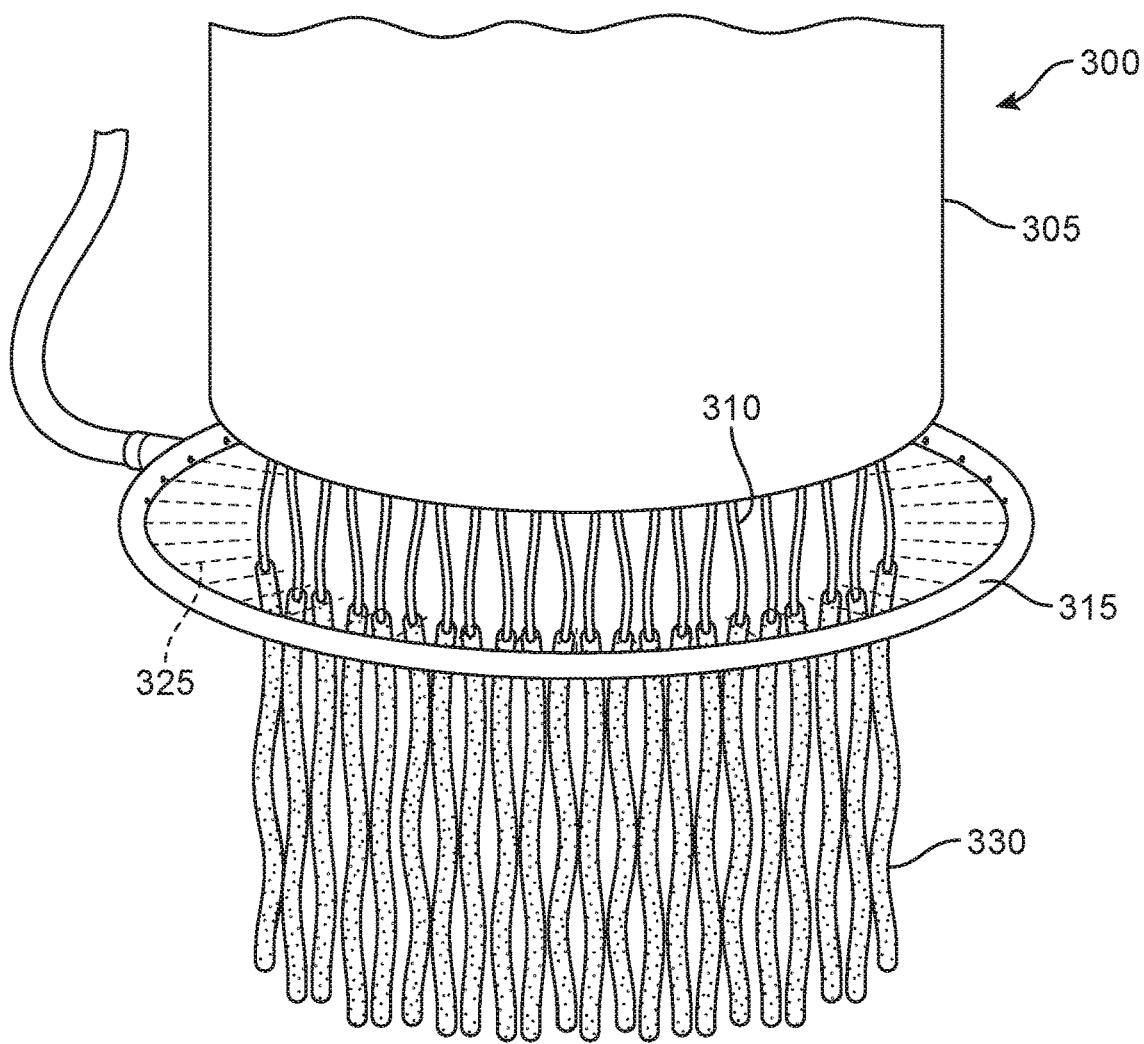
FIG. 3 is a schematic illustration of another embodiment of insulation coating.

FIG. 2 illustrates an embodiment of fiber 200 which comprises insulation fiber 210 coated with fire suppressing material 220. FIG. 3 illustrates manufacturing unit 300 for manufacturing such fiber in such embodiments. Insulation fiber 310 flows out of pipe 305. Insulation fibers 310 continue past spray ring 315. Spray ring 315 distributes intumescent material 325 onto insulation fiber 310 to produce fire suppressing fibers 330. In some embodiments, fire suppressing fibers 330 then may be formed into batts. A separate adhesive may be used to form the batts, or the intumescent material may serve as an adhesive to bind the fibers together.

Figure 4:
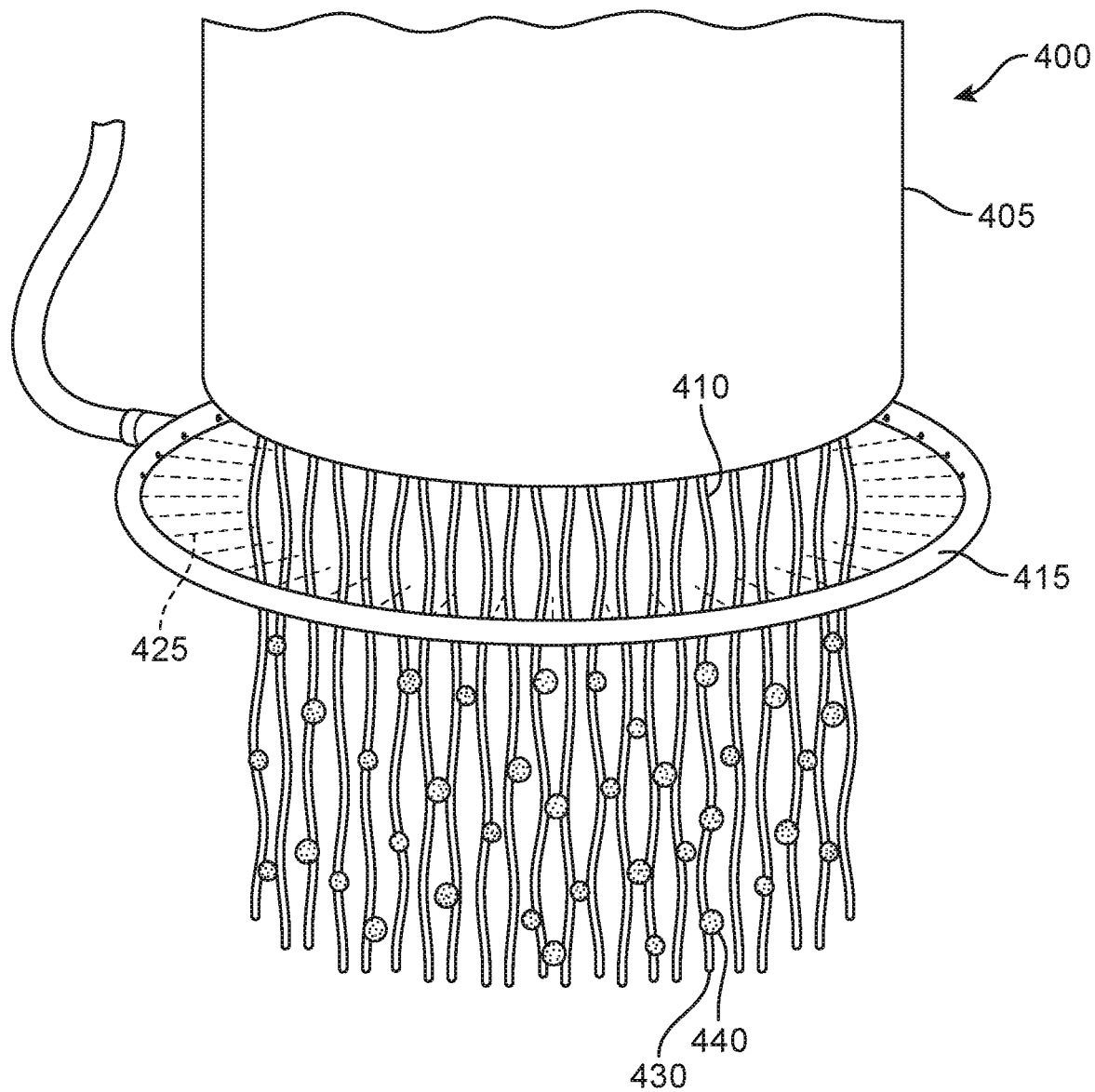
FIG. 4 is a schematic illustration of an another embodiment of insulation preparation.

In some embodiments, the intumescent material is introduced in the form of particulates. FIG. 4 illustrates an embodiment of manufacturing unit 400 for introducing particulate intumescent material 440 to insulation fiber 410 to form fire suppression product 430. Insulation fiber 410 flows out of pipe 405. Insulation fibers 410 continue past spray ring 415. Adhesive 425 containing particulate intumescent material 440 is sprayed onto insulation fibers 410 to adhere the fire suppressing particulate material and to form fire suppression product 430.

Figure 5:
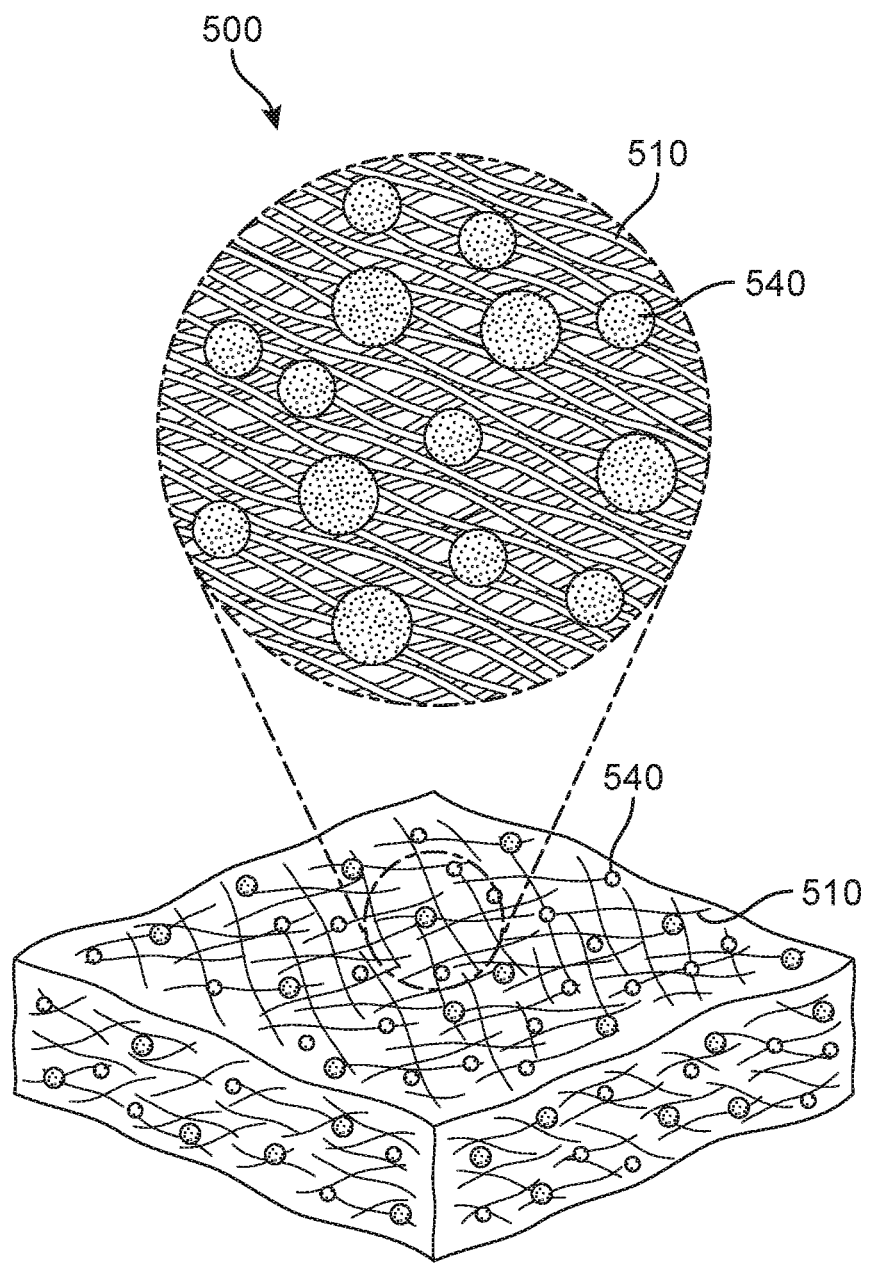
FIG. 5 is an illustration of an embodiment of insulation and fire suppressing material.

FIG. 5 illustrates the structure of fire-suppressing insulation comprising particulates 500. FIG. 5 illustrates insulation fibers 510 with fire suppressing intumescent material particulates 540 attached thereto. The arrangement of particles 540 within the fiber ensures that the particulates are distributed throughout the fibers in a quantity sufficient to form a fire suppressing barrier when heated.

In some embodiments, the disclosure provides a system having fire-suppressing insulation between an interior wall and an exterior wall of a structure. The interior wall and the exterior wall are separated by a divider, and fire-suppressing insulation is disposed within at least a portion of a volume formed by the interior wall, the exterior wall, and the divider.

Figure 6:
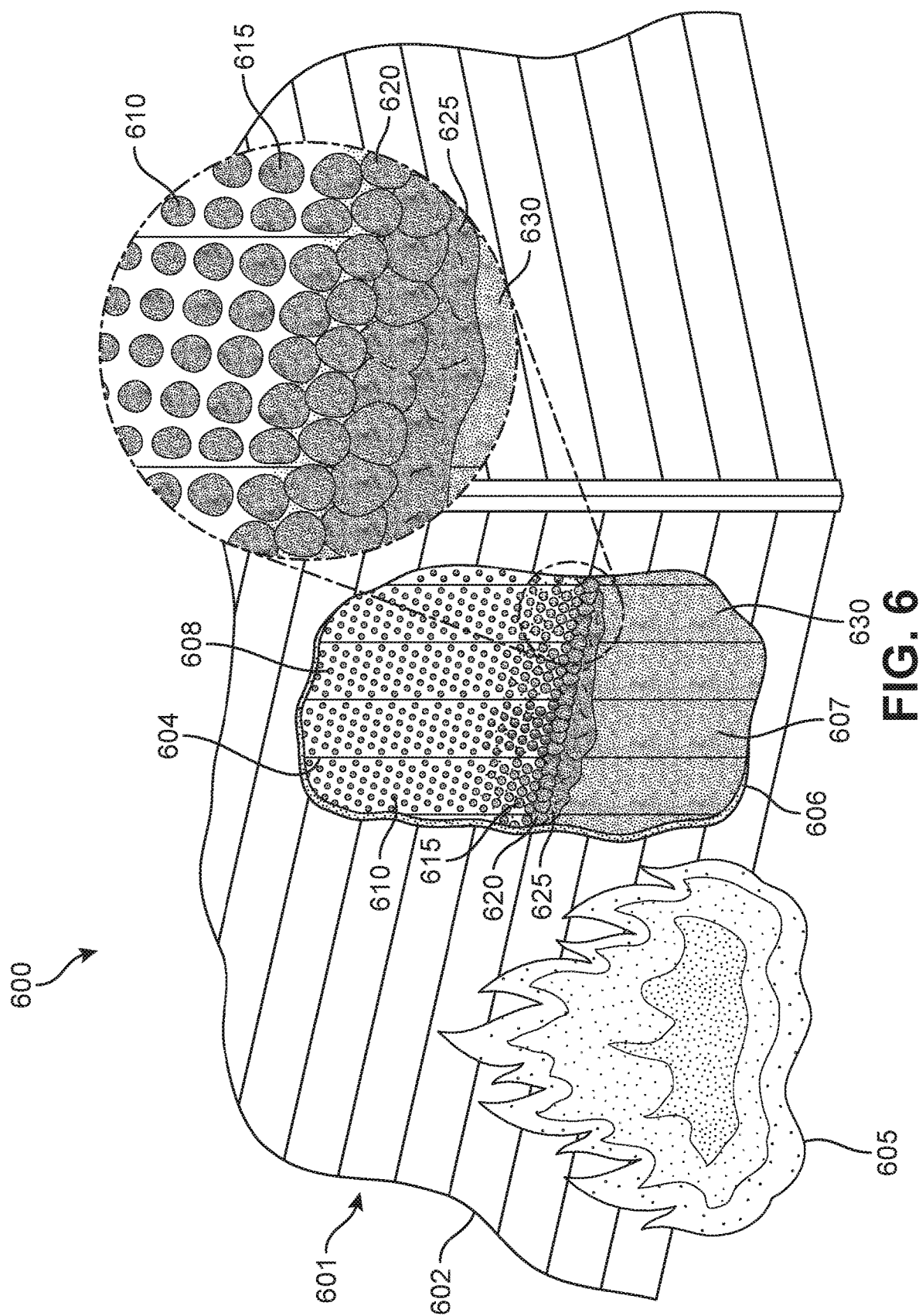
FIG. 6 is a schematic illustration of an embodiment of a system of the disclosure.

FIG. 6 illustrates an embodiment of fire-suppressing insulation comprising particulate intumescent material in a wall. Fire suppressing system 600 includes a wall 601 with an exterior wall 602. Fire 605 is burning outside exterior wall 602. Cutout 606 illustrates what happens to the fire-suppressing insulation in the interior volume.

As seen in FIG. 6, the interior wall is spaced apart from exterior wall 602 by divider 604 disposed between the interior wall and exterior wall 602. The interior wall and exterior wall 602 define an interior volume 607. The volume is illustrated by the presence of fire-suppressing insulation 608. A portion of interior volume 607 includes fire suppressing insulation 608. In some embodiments, the fire suppressing insulation comprises fiber treated with an intumescent material in quantity sufficient to form a fire suppressing intumescent barrier between the interior wall and the exterior wall when exposed to the heat of a fire.

FIG. 6 illustrates formation of a char layer within fire suppressing system 600 in response to fire. In some embodiments, fire 605 will be exterior to structure 600. Fire 605 has burned for some period, and formation of char barrier 630 has begun. As can be seen, a portion of fire-suppressing insulation 608 disposed away from fire 605 is virtually unaffected, as the particulates have not yet softened fire suppressing intumescent 607. However, as one moves closer to the flame, i.e., away from unaffected zone 610, the intumescent material particulates in zone 615 begin to expand to form a char barrier. The individual particulates in zone 615 are expanding and starting to overlap. Intumescence continues, and zone 620 particulates expand even further and begin to touch and overlap.

As fire 605 continues to burn, area 625 begins to form char, and individual particulates of intumescent material are losing their separate identity to form a continuous char 630. Complete char 630 provides a barrier against continued burning. In some embodiments, the individual particulates of intumescent material have lost their identity and only complete char 630 remains as a unified slab forming a barrier to flame.

Figure 7:
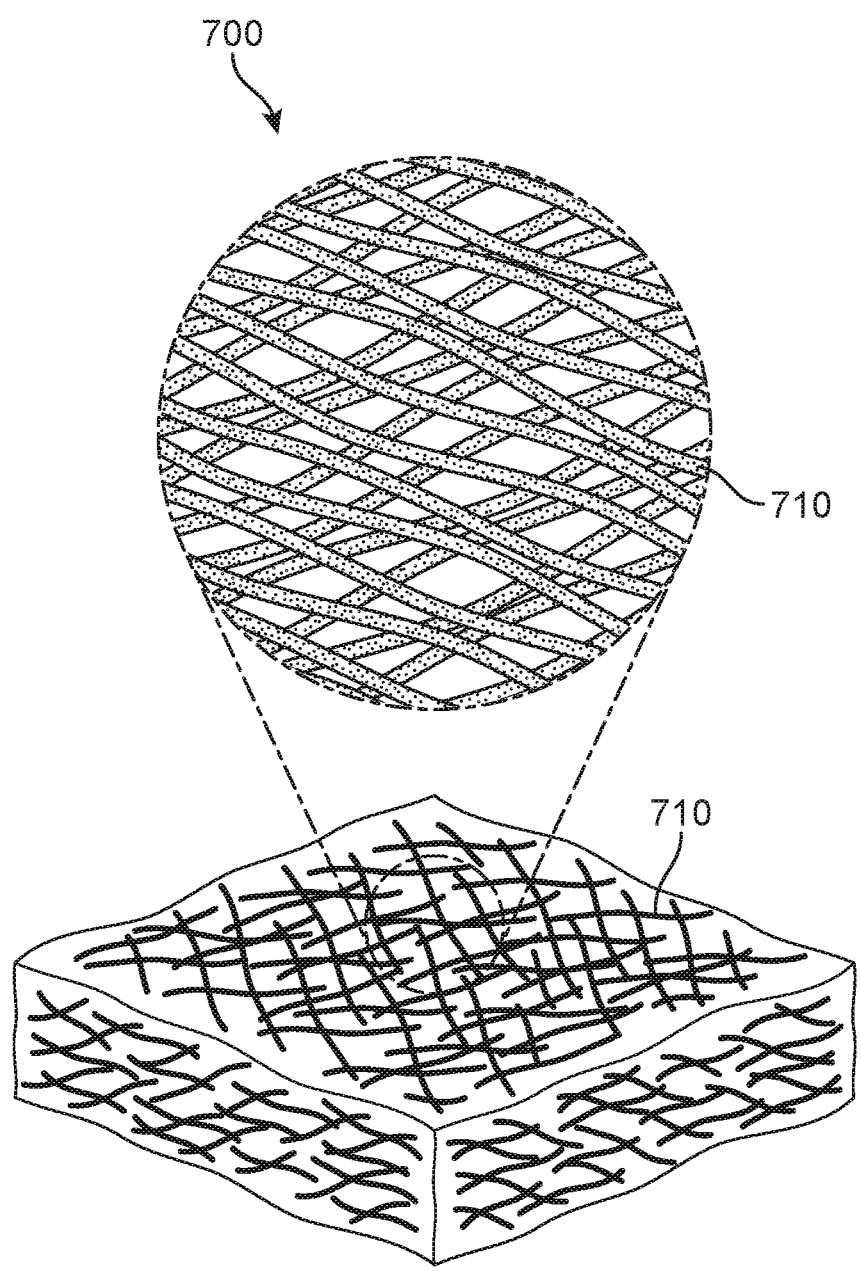
FIG. 7 is an illustration of another embodiment of insulation and fire suppressing material.

Another embodiment of fire-suppressing insulation disclosed herein is illustrated in FIG. 7. Fire-suppressing insulation 700 comprises insulation fibers coated with intumescent material to form intumescent-coated fibers 710. In some embodiments, the fire-suppressing insulation is in the form of batts.

Figure 8:
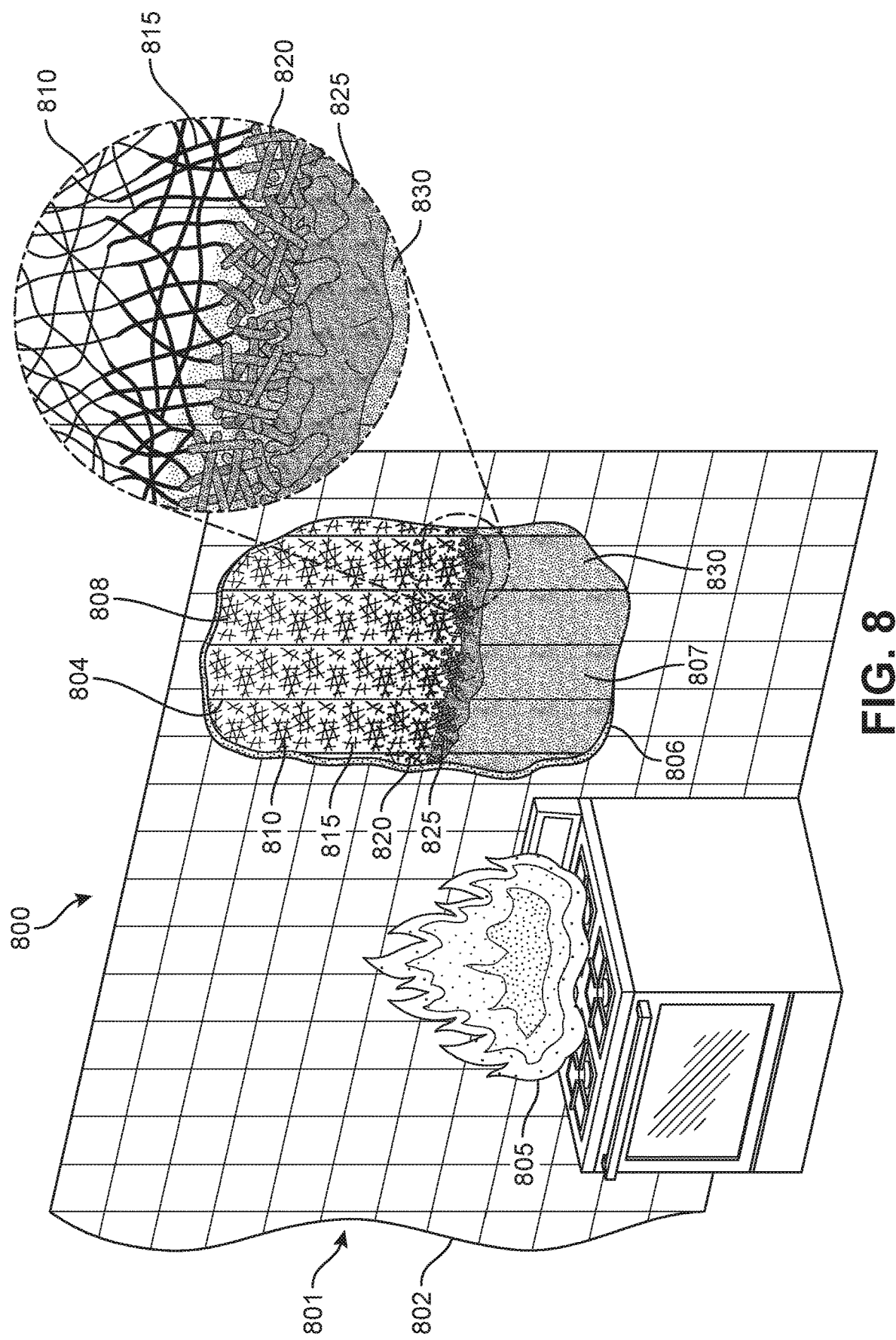
FIG. 8 is a schematic illustration of another embodiment of a system of the disclosure.

In some embodiments, the disclosure provides a fire suppressing system comprising fire-suppressing insulation between two interior walls separated by a divider. FIG. 8 illustrates an embodiment of this aspect of the disclosure. As shown in FIG. 8, system 800 includes wall 801. In some embodiments, wall 801 includes first interior wall 802 and a second interior wall. Cutout 806 illustrates what happens to the fire-suppressing insulation in the interior volume. The first interior wall 802 is spaced apart from the second interior wall by divider 804 disposed between the first interior wall 802 and the second interior wall. The first interior wall 802 and the second interior wall define an interior volume 807. The volume is illustrated by the presence of fire-suppressing insulation 808 in at least a portion of interior volume 807. In some embodiments, the fire suppressing insulation comprises fiber coated with an intumescent material, as illustrated in FIG. 7, in quantity sufficient to form a fire-suppressing intumescent barrier between the first interior wall and the second interior wall when exposed to the heat of a fire.

FIG. 8 illustrates formation of a char layer within fire suppressing system 800 in response to fire. In some embodiments, fire 805 will be adjacent to first interior wall 802. Fire 805 has burned for some period, and formation of char barrier 830 has begun. As can be seen, fire-suppressing insulation 808 is virtually unaffected, as the intumescent material has not yet softened. However, as one moves closer to the flame, i.e., away from unaffected zone 810, the intumescent material in zone 815 begin to expand to form a char barrier. The individual fibers in zone 815 are expanding and starting to overlap. Intumescence continues, and zone 820 fibers expand even further and begin to touch, filling open spaces between the fibers, and to overlap.

As fire 805 continues to burn, area 825 begins to form char, and individual fibers coated with intumescent material are losing their separate identity to form a continuous char 830. Complete char 830 provides a barrier against continued burning. In some embodiments, the individual fibers coated with intumescent material have lost their identity and only complete char 830 remains as a unified slab and forms a barrier to flame.

FIG. 6 and FIG. 8 illustrate use of fire-suppressing insulation in vertical walls. However, ceilings also may make use of an embodiment of a system of the disclosure. If there is a floor above the ceiling, then the ceiling may be considered to be the first interior wall and the floor above may be considered to be a second interior wall. The fire-suppressing insulation and systems of the disclosure also may include a circumstance wherein there is no floor above the ceiling. One such circumstance is a ceiling that is attached to joists. In some embodiments, fire-suppressing insulation may be placed between the joists and may be put over the joists. Both batts and blown-in type fire-suppressing insulation are suitably used for this purpose.

In all aspects, the intumescent material expands in the heat of a fire and forms an essentially continuous fire suppressing layer during a fire. The fire suppressing layer protects flammable material on the side opposite the flame from burning. Intumescent materials swell when exposed to the heat of a fire. Intumescent material increases in volume and decreases in density. Both effects are favorable for fire suppression. Sheetrock, plaster board, wood, foams (both open cell and closed cell), composites, fiberglass, concrete, sheet metal, and carbon and graphite surfaces may be commonly found in structures and protected from fire in a system disclosed herein. Intumescent materials may be used on both horizontal surfaces and vertical surfaces.

The chemical compositions of intumescent materials may be complex. Typically, intumescent materials may contain slag wool, Portland cement, Quartz, mineral wool, and rock wool. Other intumescent materials comprise polyphosphates, polyols, and cyanamides. Still other types of intumescent materials comprise silicates and graphite. Any of these compositions may be suitable for use in the embodiments of the disclosure.

Intumescent materials also may be characterized as producing a soft char or a hard char. Both are suitably used in embodiments of the disclosure. Intumescent materials may produce a soft char that is a poor conductor of heat and so retards heat transfer. Typically, a soft or light char consists of microporous carbonaceous foam formed by a chemical reaction of a polyphosphate, a polyol, and a cyanamide. A meltable binder typically comprising vinyl acetate copolymers or styrene acrylates completes the reaction system.

In some embodiments, an ablative coating may be used. Ablative coatings typically rely on release of water vapor from the coating, which comprises hydrates. When water is no longer released from the composition, the char that remains serves to reduce heat transfer.

Soft char products typically may be used in thin gild intumescent materials for fireproofing steel. Typically, the expansion pressure created by these products is low because the char has little resistance to damage. However, the low density of a soft char is advantageous in producing a layer of insulation.

Silicate- and graphite-containing products produce hard char. In embodiments, such chars are hard chars that exert expansion pressure. Therefore, they are suitable for use in firestops. Also, a hard char may be better able to survive imposition of high energy release by a fire than a soft char.

Intumescent materials are available in many formats. For example, intumescent paints and coatings that can be applied by brushing or by air-gun or other suitable sprayer is available. Intumescent caulks, papers, and putties also are available. A suitable intumescent material may be identified and selected by the user. These formats may be conveniently used in embodiments of the disclosure. Putty or caulk products may be used to generate particulate intumescent material for use in embodiments of this disclosure.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A fire suppressing insulation, the insulation comprising a plurality of fibers treated with an intumescent material in quantity sufficient to form a fire suppressing intumescent barrier when exposed to the heat of a fire; wherein each individual fiber in the plurality of fibers is evenly coated with the intumescent material prior to any exposure to a fire along a length of each individual fiber so as to create an even cross-section around each fiber, the intumescent material being coated onto the plurality of fibers in such a manner that individual intumescent material expands and overlaps with adjacent intumescent material to form a continuous char barrier layer that is a unified slab during a fire; and wherein the intumescent material is adhesive, so as to bind the plurality of fibers together during manufacturing of the insulation prior to any exposure to a fire.

2. The fire suppressing insulation of claim 1, wherein the plurality of fibers are in the form of fiber-containing batts.

3. The fire suppressing insulation of claim 1, wherein the intumescent material yields a soft char.

4. The fire suppressing insulation of claim 3, wherein the intumescent material is an ablative material.

5. The fire suppressing insulation of claim 1, wherein the intumescent material yields a hard char.

6. The fire suppressing insulation of claim 1, wherein
the intumescent material is evenly coated onto the fibers along an axial length of each individual fiber; and
the intumescent material is evenly coated onto each individual fiber around its exterior.

7. The fire suppressing insulation of claim 1, wherein the intumescent material is evenly coated onto the fibers so as to completely surround each fiber around a cross section of each fiber.

8. The fire suppressing insulation of claim 7, wherein the intumescent material is adhered to the fibers.

9. The fire suppressing insulation of claim 8, wherein the intumescent material is adhered to the fiber with a second intumescent material.

10. A fire suppressing system, the system comprising a wall having an interior wall and an exterior wall; the interior wall spaced apart from the exterior wall by a divider disposed between the interior wall and the exterior wall; the interior wall and the exterior wall defining an interior volume; and a portion of the interior volume including fire suppressing insulation, the fire suppressing insulation comprising a plurality of fibers treated with an intumescent material in quantity sufficient to form a fire suppressing intumescent barrier between the interior wall and the exterior wall when exposed to heat of a fire; wherein each individual fiber in the plurality of fibers is evenly coated with the intumescent material prior to any exposure to a fire along a length of each individual fiber so as to create an even cross-section around each fiber, the intumescent material being coated onto the plurality of fibers in such a manner that individual intumescent material expands and overlaps with adjacent intumescent material to form a continuous char barrier layer that is a unified slab during a fire; and wherein the intumescent material is adhesive, so as to bind the plurality of fibers together during manufacturing of the insulation prior to any exposure to a fire.

11. The fire suppressing system of claim 10, wherein the fire suppressing insulation fibers are in the form of batts.

12. The fire suppressing system of claim 10, wherein the intumescent material yields a soft char.

13. The fire suppressing system of claim 10, wherein the intumescent material is coated onto the fibers.

14. The fire suppressing system of claim 10, wherein the intumescent material comprises particulate material dispersed in a batt and is adhered to the fibers.

15. A fire suppressing system, the system comprising a wall having a first interior wall and a second interior wall; the first interior wall spaced apart from the second interior wall by a divider disposed between the first interior wall and the second interior wall; the first interior wall and the second interior wall defining an interior volume; and a portion of the interior volume including fire suppressing insulation, the fire suppressing insulation comprising a plurality of fibers treated with an intumescent material in quantity sufficient to form a fire suppressing intumescent barrier between the first interior wall and the second interior wall when exposed to heat of a fire; wherein each individual fiber in the plurality of fibers is evenly coated with the intumescent material prior to any exposure to a fire along a length of each individual fiber so as to create an even cross-section around each fiber, the intumescent material being coated onto the plurality of fibers in such a manner that individual intumescent material expands and overlaps with adjacent intumescent material to form a continuous char barrier layer that is a unified slab during a fire; and wherein the intumescent material is adhesive, so as to bind the plurality of fibers together during manufacturing of the insulation prior to any exposure to a fire.

16. The fire suppressing system of claim 15, wherein the fire suppressing insulation fibers are in the form of batts.

17. The fire suppressing system of claim 15, wherein the intumescent material yields a soft char.

18. The fire suppressing system of claim 15, wherein the intumescent material is coated onto the fibers.

19. The fire suppressing system of claim 15, wherein the intumescent material comprises particulate material dispersed in a batt and is adhered to the fibers.

20. The fire suppressing system of claim 15, wherein
the intumescent material is selected from the group consisting of: slag wool, Portland cement, quartz, mineral wool, rock wool, polyphosphates, polyols, cyanamides, silicates, and graphite.

* * * * *